(12) United States Patent
Brown

(10) Patent No.: US 8,643,829 B2
(45) Date of Patent: Feb. 4, 2014

(54) SYSTEM AND METHOD FOR BRILLOUIN ANALYSIS

(76) Inventor: Anthony Brown, New Brunswick (CA)

( * ) Notice: Subject to any disclaimer, the term of this patent is extended or adjusted under 35 U.S.C. 154(b) by 11 days.

(21) Appl. No.: 13/392,807

(22) PCT Filed: Aug. 27, 2010

(86) PCT No.: PCT/CA2010/001322
§ 371 (c)(1),
(2), (4) Date: Jul. 12, 2012

(87) PCT Pub. No.: WO2011/022829
PCT Pub. Date: Mar. 3, 2011

(65) Prior Publication Data
US 2012/0281201 A1    Nov. 8, 2012

Related U.S. Application Data

(60) Provisional application No. 61/237,492, filed on Aug. 27, 2009, provisional application No. 61/308,109, filed on Feb. 25, 2010.

(51) Int. Cl.
*G01B 11/16* (2006.01)

(52) U.S. Cl.
CPC ....................................... *G01B 11/18* (2013.01)
USPC .................................. 356/32; 356/33; 356/34

(58) Field of Classification Search
CPC ....................................................... G01B 11/18
USPC ...................................................... 356/32–34
See application file for complete search history.

(56) References Cited

U.S. PATENT DOCUMENTS 8,427,651 B2 * 4/2013 Digonnet ....................... 356/460
2003/0021306 A1 * 1/2003 Fernald et al. .................. 372/20

FOREIGN PATENT DOCUMENTS

EP          0907073         7/1999

OTHER PUBLICATIONS

International Search Report, PCT/CA2010/001322, Dec. 9, 2010.
International Preliminary Report on Patentability, PCT/CA2010/001322, Feb. 9, 2012.

* cited by examiner

*Primary Examiner* — Michael P Stafira
(74) *Attorney, Agent, or Firm* — Bradley Arant Boult Cummings LLP

(57) ABSTRACT

A Brillouin analysis sensor system comprising: a Brillouin analysis sensor; a polarization beam splitter/combiner, operably connected to the Brillouin analysis sensor between the sensor and the sensing fiber, for receiving polarized lightwaves from the sensor, combining the lightwaves and launching combined lightwaves waves in the sensing fiber a first direction, and a phase conjugate mirror at a free end of the sensing fiber for receiving combined lightwaves from the polarization beam splitter/combiner, rotating the polarization of the combined lightwaves and launching the rotated combined lightwaves in the sensing fiber in an opposing direction to the first direction.

21 Claims, 8 Drawing Sheets

SYSTEM AND METHOD FOR BRILLOUIN ANALYSIS

FIELD

The present invention relates to fibre optic distributed sensor systems and methods and, in particular, to systems and methods employing Brillouin analysis.

BACKGROUND

A Brillouin analysis sensor is a fibre optic distributed sensor that can measure changes in the local strain and/or temperature conditions of an optical sensing fibre through analysis of the Brillouin frequency of the sensing fibre at any point. The sensing fibre is usually attached to or embedded in a host material and is used to measure the strain and/or temperature conditions of the host. Both strain and temperature cause a shift in the Brillouin frequency. Position is determined by the round-trip transit time of the optical signal in the fibre. Reference herein to a Brillouin analysis sensor system shall mean a Brillouin analysis sensor plus an optical sensing fibre.

A Brillouin analysis sensor system operates on the principle of Brillouin amplification. In a Brillouin amplifier, a signal (or Stokes) light wave propagating in one direction experiences optical gain if its frequency falls within the Brillouin gain profile of the amplifier pump wave propagating in the opposite direction. The Stokes wave experiences gain (with a corresponding loss from the pump) in accordance with the Brillouin gain profile. The power in either wave may be monitored to determine the Brillouin gain profile; if the Stokes wave is chosen to be monitored then the system is said to operate in Brillouin gain mode (as any interaction causes an increase in the Stokes wave). Otherwise, it is said to operate in Brillouin loss mode.

Two lasers may be used to generate the two lightwaves, in which case the frequency difference between them is maintained and controlled by a control loop (often a phase-locked loop). Alternatively, a single laser source may be used and a second lightwave generated from it by optical frequency modulation (using an electronic signal of the desired frequency).

One type of Brillouin analysis sensor is a Brillouin Optical Time Domain Analysis ("BOTDA") system. To obtain spatial information in a BOTDA system, one of the two light waves is pulsed by an electro-optic modulator (EOM) driven by an electronic pulse generator, while the intensity of the other light wave is monitored as a function of time elapsed (i.e. in the time domain) since the generation of the pulse. In this way position, z, is determined from the time-of-flight, t, as $z=ct/2n$, where c is the speed of light and n is the group index of refraction of the fibre. The intensity of the interaction (either gain or loss depending on which wave is monitored) is a function of the relative frequency difference between the two lasers. It is also a function of the gain profile of the fibre at the point of interaction, which moves (with the pulse) along the fibre. The frequency difference is swept over some range of frequencies of interest. Since frequency characteristics of the Brillouin profile are modified by the strain and temperature conditions of the sensing fibre, the local strain and temperature conditions can be inferred from a measurement of the Brillouin gain or loss profile. This profile is obtained by considering the Brillouin interaction at a given point in space as a function of frequency difference.

A second type of Brillouin analysis sensor is the Brillouin Optical Frequency Domain Analysis sensor ("BOFDA"). In frequency domain analysis, a sine-wave amplitude modulated light wave is used in place of the pulse modulated wave used in BOTDA. Measurements are carried out in the frequency domain by sweeping this modulation frequency and measuring the interaction with the cw wave. The frequency domain data can be mathematically transformed to the time domain to obtain the positional information which is the equivalent of the signal that would be obtained by BOTDA.

A third type of Brillouin analysis sensor is the Brillouin Optical Correlation Domain Analysis sensor ("BOCDA"). In correlation domain analysis both light waves are modulated and positional information is extracted from the correlation of the two signals. Correlation based sensors can have very high resolutions, although at the cost of limited overall sensing length.

Traditionally bright pulses have been used to interrogate the sensing fibre with BOTDA systems, however the use of dark pulses has recently been shown to have several advantages in terms of resolution, accuracy and speed.

BOTDA (and all other Brillouin analysis distributed sensors) require that the state of polarization ("SOP") be matched (parallel) between the two light waves (pump and Stokes) at all locations in the sensing fibre. If the SOP is not matched, then the intensity of the Brillouin signal will fade at locations where the SOP is mismatched, resulting in amplitude noise and possibly locations in the sensor where the two SOPs are orthogonal and no signal can be obtained.

In prior art BOTDA sensor systems, the SOP can be kept aligned but only if special polarization-maintaining ("PM") fibres are used as the sensing element. Such fibres have higher attenuation, are much more expensive and are more difficult to work with compared to standard single mode fibres ("SMF").

If non-PM fibre (i.e. SMF) is used, then the state of polarization of the two lightwaves will vary with position (and possibly with time) along the fibre length. To deal with this situation, a prior art BOTDA system will often take multiple measurements on SMF, altering the lightwaves' relative polarization states between measurements, and using an average result. It has been shown that using averaged data from switching one of the waves between two orthogonal polarization states can reduce polarization fading, however the averaged signal will only be one half of the maximum Brillouin signal.

Alternatively, a set of measurements taken with three particular SOPs can improve this average to two thirds of the maximum, but requires at least triple the time to take data. Moreover, the devices typically used to alter the SOP in a BOTDA system have switching times which are slow enough to significantly add to the overall acquisition time of the sensor. Also, because the multiple measurements are made at different times, it is possible for changes to the conditions of the sensor (e.g. mechanical vibrations or motions) between measurements to alter the SOP so that the multiple measurements no longer average orthogonal SOPs, thus reducing the efficacy of polarization averaging methods.

BOTDA distributed sensor systems are therefore subject to polarization fading effects which require expensive PM fibre or polarization averaging schemes.

SUMMARY

In a Brillouin analysis system embodying the principles of the invention, an SMF sensing fibre is used with a phase conjugate mirror (for example a Faraday Rotator Mirror ("FRM")) placed at the far end of the sensing fibre, and a polarization beamsplitter/combiner is used to combine polarized cw and pulse waves and launch them with orthogonal polarization states into one end of the SMF fibre.

In accordance with one embodiment of the invention, first and second polarized light waves (pump and Stokes) are generated where the waves are orthogonal relative to each other and are co-propagated through a single mode sensing fibre in a first direction. The orthogonal waves are then reflected by a FRM so that the SOP of each reflected wave is rendered orthogonal to the incident wave while the reflected waves propagate in a direction reverse to the first direction. In this manner, the reverse-travelling Stokes wave's SOP is rendered parallel to the forward travelling pump wave, while the reverse-travelling pump wave's SOP is rendered parallel to the forward travelling Stokes wave. The counter-propagating pump and Stokes waves therefore have parallel SOPs and can undergo Brillouin amplification and be processed by the beamsplitter.

In accordance with another embodiment of the invention, first and second polarized light waves (pump and Stokes) are generated where the waves are orthogonal relative to each other and parallel to the principal axes of the sensing fibre, and are co-propagated through a single mode sensing fibre in a first direction. The orthogonal waves are then reflected by a FRM so that the SOP of each reflected wave is rendered orthogonal to the incident wave while the reflected waves propagate in a direction reverse to the first direction. In this manner, the reverse-travelling Stokes wave's SOP is rendered parallel to the forward travelling pump wave, while the reverse-travelling pump wave's SOP is rendered parallel to the forward travelling Stokes wave. The counter-propagating pump and Stokes waves therefore have parallel SOPs and can undergo Brillouin amplification and be processed by the beamsplitter.

BRIEF DESCRIPTION OF THE DRAWINGS

Like reference numerals and designations in the drawings indicate like elements providing similar functionality.

DETAILED DESCRIPTION

Figure 1:
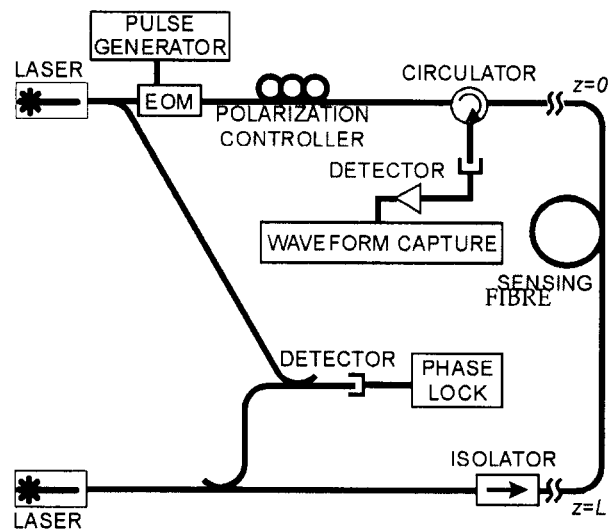
FIG. 1 depicts a prior art BOTDA system.
Figure 2:
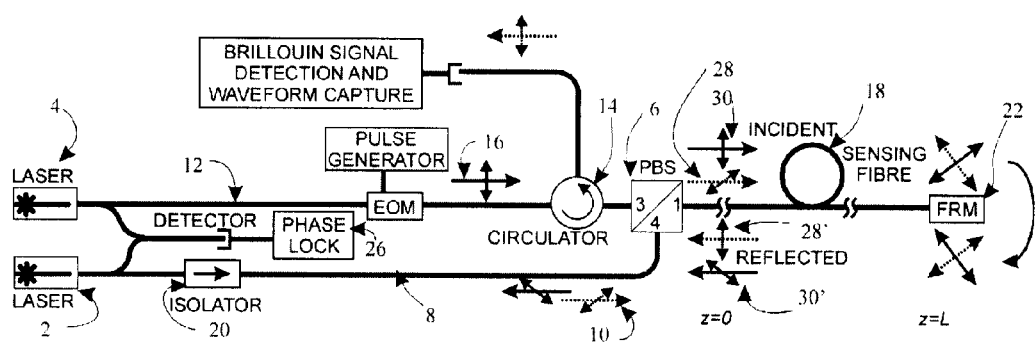
FIG. 2 depicts a BOTDA system embodying principles of the invention.

FIG. 1 depicts a prior art BOTDA system while FIG. 2 depicts a BOTDA system embodying the principles of the present invention. Compared to the prior art BOTDA system depicted in FIG. 1, the cw laser in the BOTDA system of FIG. 2 has been moved from the z=L end of the fibre to the z=0 end.

The pulsed laser 4 and the cw laser 2 are combined with a polarization beam splitter/combiner ("PBS") 6 such that the outgoing pump and Stokes waves from the lasers 2 and 4 are combined and are launched in orthogonal polarization states at z=0.

The PBS 6 is a four port device (NovaWave model DPBS-55-P-2-L-3-Q) that routes input optical signals from port to port based only on their SOP. In particular, a vertically polarized lightwave impinging on port 3 will be routed to port 1 and vice versa (i.e. a vertically polarized wave impinging on port 1 is routed to port 3). A horizontally polarized wave impinging on port 4 is routed to port 1 and vice versa. In the PBS 6, port 2 (not shown) is not used, but port 2 would receive horizontally-polarized signals from port 3 and vertically polarized signals from port 4. Similarly, signals arriving at port 2 would be routed by SOP with horizontally polarized signals going back to port 3 and vertically polarized signals going to port 4.) A signal that is itself neither horizontally nor vertically polarized can always be resolved into two components that are horizontally and vertically polarized that are each routed as above.

In FIG. 2, port 3 receives the (vertically polarized) laser input indicated by numeral 16 and port 4 receives the (horizontally polarized) laser input indicated by numeral 10. According to the above, both waves are therefore routed to port 1 as depicted in FIG. 2.

Since port 2 of the PBS 6 is not used, a suitable three port PBS could be used instead.

In the pulsed laser path 12, the circulator 14 must be polarization maintaining to ensure that the SOP of the pulse wave 16 entering the PBS 6 is correctly aligned for transmission to the sensing fibre 18. A PM isolator 20 is used in the cw laser path 8 for aligning the SOP of the cw laser wave 10 at the PBS 6 for transmission to the sensing fibre 18. The combined orthogonal incident cw and pulse waves entering the sensing fibre 18 are indicated by numerals 28 and 30.

A phase-locked loop 26 maintains and controls the frequency difference between lightwaves generated by the lasers 2 and 4. A Faraday Rotator Mirror ("FRM") 22 is located at the opposite end of the sensing fibre 18 to both reflect the orthogonal incident waves 28 and 30 as well as to rotate the SOP of the reflections. Upon reflection from the FRM 22, the waves 28 and 30 have their SOP's rotated by 180° around the Poincaré sphere and are reflected as waves 28' and 30' which transit the fibre 18 remaining orthogonal to each other until they reach the beginning of the fibre once again.

An isolator 20 also absorbs the Faraday reflection of the pulsed laser lightwave 30 (to prevent it entering and destabilizing the cw laser 2) since the SOP of lightwave 30' is such that it is routed this way by the PBS 6.

The wave 30' reaches the PBS 6 with horizontal polarization while the wave 28' arrives vertically polarized (that is, opposite to the way they were initially launched). This means that the returning wave 28' is routed to port 3, the port that the wave 30 originally came from. The wave 30' is routed to port 4, where the red wave came from. The PBS 6 does processing on the waves based on SOP.

A FRM is a type of Phase Conjugate Mirror and other suitable types of Phase Conjugate Mirrors can be used, including ones that are themselves based on Brillouin scattering. A Faraday Rotator Mirror is an optical device that both reflects an incoming wave and rotates its polarization vector by 180 degrees on the Poincaré sphere. For example, an incident wave that is vertically polarized will be reflected with horizontal polarization while circularly polarized light will have its handedness reversed. Since all birefringence-induced changes in SOP of a light wave caused by transit through a fibre are reciprocal and met in the reverse order by the Faraday reflected wave, the Faraday reflected wave will be in an orthogonal SOP to that of the incident wave at all points in the fibre, i.e:

$$\vec{S}^r(Z) = -\vec{S}^i(Z) \qquad (1)$$

Consider a Brillouin Analysis sensor system as shown in FIG. 2 where the pump and Stokes waves are launched from the same end of the sensing fibre but with initially orthogonal SOPs, then $$\vec{S}_p^i(0) = -\vec{S}_{cw}^i(0) \qquad (2)$$

Considering the BOTDA system of FIG. 2, (although the technique is applicable to BOFDA and BOCDA systems as well) in which a pulsed (p) wave is launched with a linear vertical polarization while a Stokes (cw) wave is launched with horizontal polarization (the two waves are assumed to be aligned with the principal polarization axes of the sensing fibre). This is easily implemented with a polarization beam splitter (PBS). Since the two waves are travelling in the same direction there will be no Brillouin interaction between them. Also, since both SOPs are initially launched on the principal axes, they will undergo identical SOP rotations due to fibre birefringence and remain orthogonal throughout their transit to the far end of the sensing fibre, i.e:

$$\vec{S}_p^i(Z) = -\vec{S}_{cw}^i(Z) \qquad (3)$$

Although their absolute states of polarization will vary over position due to random birefringence in the fibre, the SOP vectors will always be antiparallel (that is, the SOPs will be orthogonal). If the sensing fibre is terminated in an FRM, then upon reflection both waves will have their SOPs rotated by 180° around the Poincaré sphere. This will align the SOP of each reflected wave with that of the other incident wave. Again, the two waves will transit the fibre, remaining orthogonal to each other until they reach the beginning of the fibre once again. In the particular configuration of FIG. 2, the Stokes wave will arrive back horizontally polarized while the pump will be vertically polarized. At every point in the fibre the outgoing Stokes wave is orthogonal to the outgoing pump wave according to equation 3.

Since by equation (1), everywhere the returning pump is orthogonal to the outgoing pump, it follows that $$\vec{S}_p^i(Z) = \vec{S}_{cw}^r(Z) \qquad (4)$$

that is, the outgoing Stokes wave will everywhere be parallel to the returning pump wave. This is the optimal situation for operating a BOTDA sensor in that there will be no polarization fading. Furthermore, upon reflection from the FRM the Stokes wave will also rotate SOP to match the incident pump. Again, since the reflected Stokes wave is everywhere orthogonal to the incident Stokes wave, and since everywhere the incident pump wave is orthogonal to the incident Stokes wave, it follows that $$\vec{S}_p^r(Z) = \vec{S}_{cw}^i(Z) \qquad (5)$$

and the reflected Stokes wave and incident pump are also everywhere parallel. Once again, we have the condition for zero polarization fading but we have, in addition, reversed the directions of the pump and Stokes waves and are therefore interrogating the fibre from the opposite direction. This is advantageous for reducing downstream distortion in the Brillouin signal. It will be noted that although only BOTDA has been considered in the description above, all Brillouin Analysis techniques (BOFDA and BOCDA) require polarization matching between the pump and Stokes waves and can therefore benefit from the principles of the invention.

In the BOTDA system of FIG. 2, the SOPs of the Stokes and pump waves are matched at all locations simultaneously. The primary advantage of this system is therefore improved immunity to polarization fading or polarization noise effects.

An additional benefit of the BOTDA system of FIG. 2 is that each measurement measures the sensing fibre twice, once on the trip from z=0 to z=L, and once on the return trip from z=L to z=0. The second set of data may be averaged with the first to improve the sensor's signal-to-noise ratio. Also, since the measurements are taken in opposite directions, any distortion downstream in the first measurement (such as is often caused by a discontinuity in fibre conditions in time domain systems) can be corrected by the second measurement which reverses the upstream and downstream directions.

A third benefit of BOTDA system of FIG. 2 is that the SOP of the incoming received signal is known. This simplifies the use of coherent (i.e. heterodyne or homodyne) detection which require polarization alignment between the incoming signal and an optical local oscillator. Coherent detection is more sensitive and has a larger dynamic range than direct detection, therefore BOTDA systems which embody features of the present invention have the potential to be more sensitive than traditional systems. Coherent detection is also required for some prior art sensing techniques such as the Dynamic strain sensor (the subject of U.S. Pat. No. 7,480,460 which also can be adapted to embody the principles of the invention.

A fourth benefit of the BOTDA system of FIG. 2 is that all optical signals are launched and collected from the same end of the fibre so no return loop is required as is the case in some traditional BOTDA systems. Only the FRM needs to be attached to the far end of the fibre and it can be located remotely.

The relative SOPs of the two lightwaves will always be orthogonal at the two ends of the sensing fibre (that is, at the polarization beamsplitter and at the Faraday rotator mirror). If the axes of the polarization beam splitter are not coincident with the principal axes of the sensing fibre then the relative states of polarization of the two waves will not, in general, be orthogonal at all points in the sensing fibre between the either end. In this case the reflected Stokes and incident pump waves will not be parallel at all points in the sensing fibre, nor will the reflected pump and incident Stokes waves be parallel at all points in the sensing fibre. However, measurements can still be taken in both directions, the incoming SOP is still known and access is still required to only one end of the sensing fibre.

One use of the BOTDA system described above with respect to FIG. 2 is to detect a deformation in a fibre caused by for example, "tripping" of the fibre by an intrusion or tampering. For example, a gas pipeline can be "wired" with the fibre but it will be understood that other locations, objects or spaces can be "wired" with the fibre of a BOTDA system. Subsequent deformation of the fibre such as by twisting and/or bending (such as from an intrusion) of the fibre at a point along the length of the fibre causes a signal travelling through the fibre from that deformation point on to the FRM (and back to the point of deformation) to change SOP while the signal in the rest of the fibre will be unchanged. The section of the fibre from the deformation point to the FRM and back will thus have a fading different from the rest of the fibre. Such changes in the fading of the fibre can be monitored to indicate the location of "something" altering the fibre shape without the need to actually quantify the magnitude or shape of the deformation.

Figure 10:
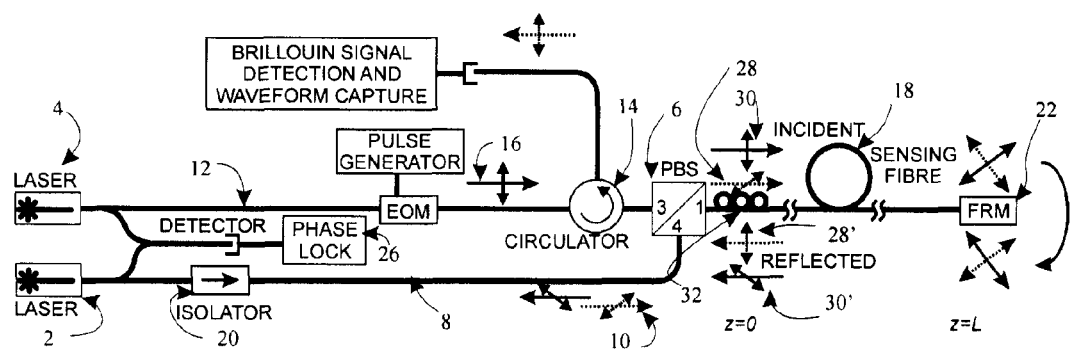
FIG. 10 depicts another BOTDA system embodying principles of the invention.

Referring to FIG. 10, in another embodiment of a BOTDA system according to the invention, a polarization controller 32 can be inserted between the PBS 6 and the sensing fibre 18 to ensure that the launched SOPs of the pump and Stokes lightwaves matches the principal axes of the sensing fibre 18. A suitable control algorithm may be required to adjust the polarization controller to track changes in the principal axes of the sensing fibre 18. In one embodiment of the control algorithm, the degree of fading in the distributed strain/temperature data is quantified and the polarization is adjusted accordingly. Alternatively, the polarization controller 32 can be used to switch between different launch states and the signal from the different launch states may be averaged to reduce polarization fading in a manner similar to conventional Brillouin Analysis systems.

The Faraday Rotator Mirror must be connected to the far end of the fibre. This may impose some environmental limitations on the end since the fibre itself can likely tolerate harsher environments (e.g. higher temperatures) than can the FRM. In such situations, the sensing fibre can be routed back out of the harsh environment to a location suitable for the FRM.

As set out above, the FRM and PBS are additional components that are needed beyond what is typically required in a BOTDA system. Besides these, some other components in the BOTDA system must be polarization-maintaining in a BOTDA system embodying the principles of the invention (whereas polarization insensitive components could be used in a traditional system). A polarization controller or switch is not required (but could optionally be used as desbribed herein) in a BOTDA system embodying the principles of the invention thus reducing the component count.

BOTDA systems which can be modified to embody the principles of the invention include those already on the market (e.g. those made by OZ Optics, Smartec and Omnisens) and those used in research labs (e.g. University of Ottawa, University of Kent, and University of Southampton).

Figure 3:
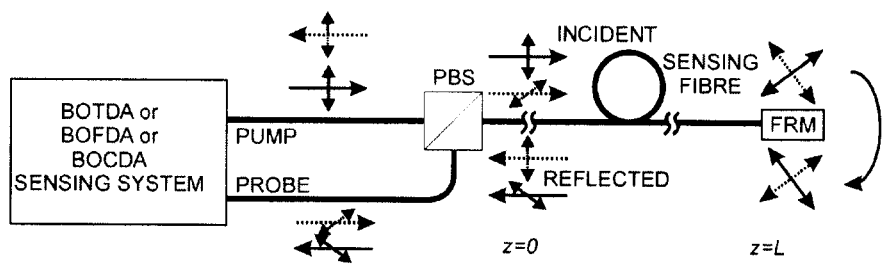
FIG. 3 depicts a generic Brillouin analysis sensor system embodying the principles of the present invention.

The principles of the invention are also applicable to Brillouin Analysis sensors operating in the frequency (Brillouin Optical Frequency Domain Analysis "BOFDA") or correlation ("BOCDA") domains since these also require polarization matching between the pump and Stokes waves. A generic configuration of a Brillouin Analysis sensor embodying the principles of the invention is depicted in FIG. 3.

Figure 4:
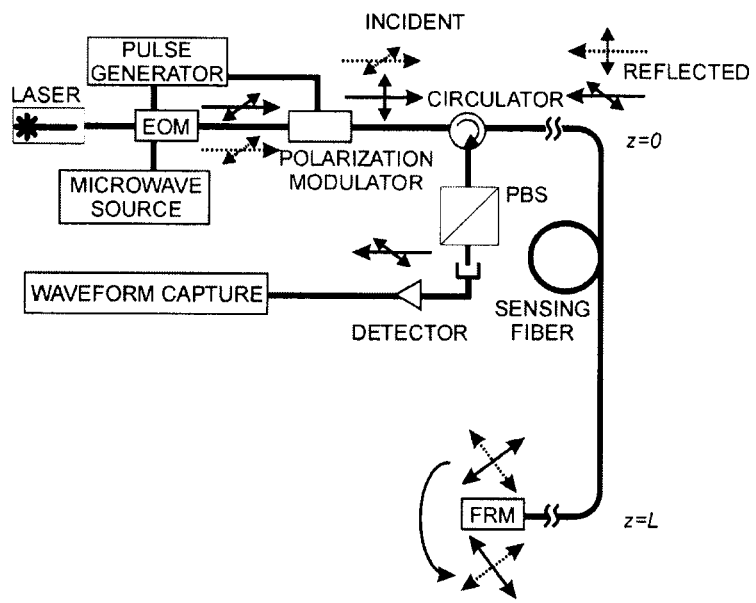
FIG. 4 depicts a Brillouin analysis system comprising a single laser and embodying principles of the invention.

Brillouin systems that generate the second lightwave from the first through optical frequency shifting often use a single modulator for both pulse generation and frequency shifting, in which case both waves are already launched into the same end of the fibre and with parallel SOPs. This situation requires a slight modification to the generic configuration of FIG. 3. Instead of using a polarization beam splitter to combine the two waves, a fast polarization modulator can be used to rotate the SOP of one of the waves that are already present on the same fibre. The polarization modulator may be fabricated into the frequency/amplitude modulator or may be added as a separate component as depicted in FIG. 4. A polarization beam splitter or polarizer is added to separate the desired signal from the reflected pulse before detection. In other embodiments, other suitable devices can be used to rotate the SOP of one of the wave that are already present on the same fibre. For example, lightwaves can be passed through a suitably birefringent material such that the birefringence is different at the two frequencies by just the right amount to result in the desired polarization shift.

The principles of the invention are applicable to either bright or dark pulse based systems.

EXAMPLES

Figure 5:
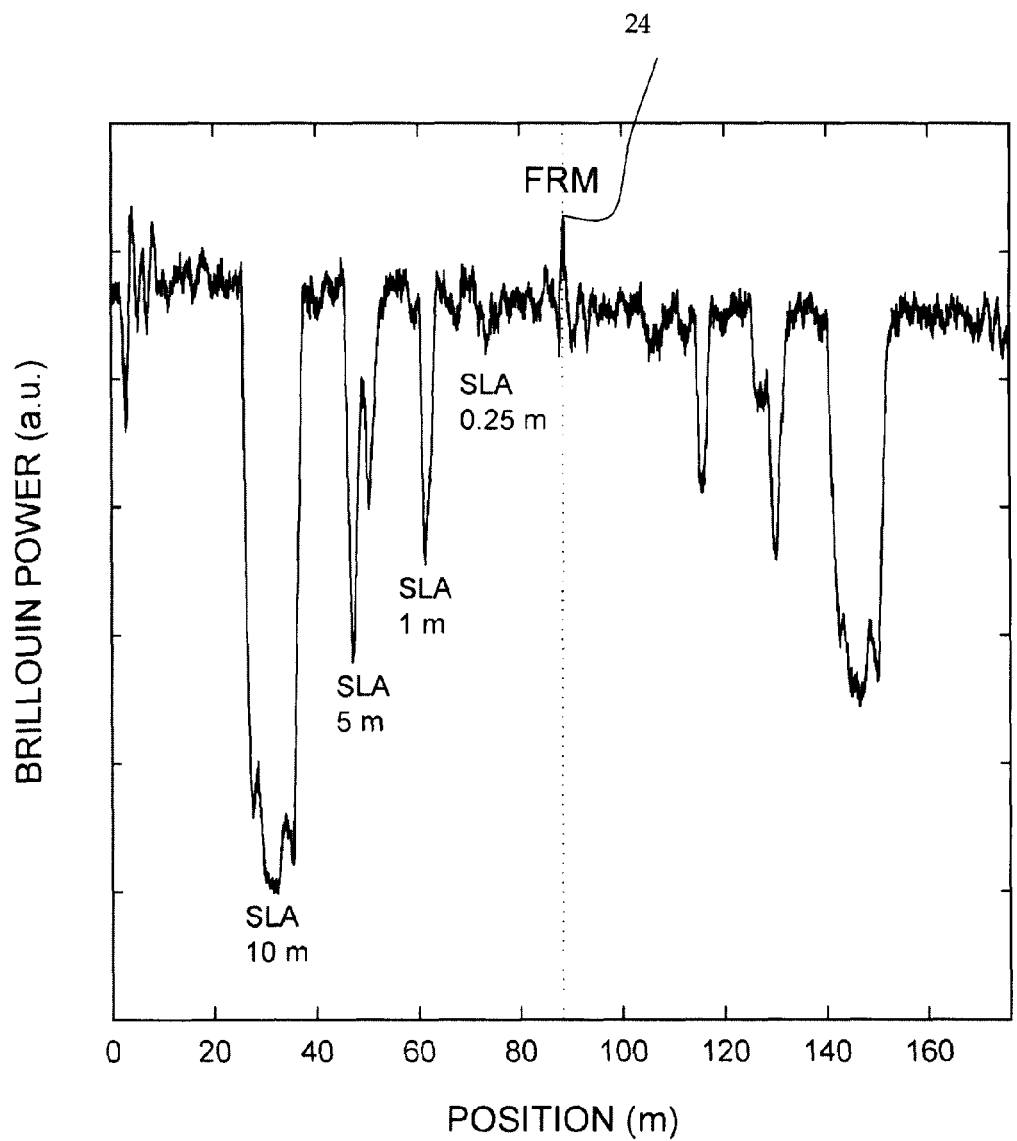
FIG. 5 depicts a time domain waveform for a Brillouin system embodying principles of the invention.

A time-domain signal produced by the BOTDA system of FIG. 2 is shown in FIG. 5. The test fibre consisted of a concatenation of alternating lengths of Corning SMF-28 and OFS Ultrawave SLA (the locations of the latter are indicated in FIG. 5), the two fibres having different Brillouin frequencies. In this sample waveform, the sensor is tuned to the Brillouin frequency of the Ultrawave SLA fibre. The location of the FRM is indicated at 24 in FIG. 5, and it will be observed that the signal is essentially a mirror image about this point. The signal strength is observed to be slightly less in the second half of the waveform due to the insertion loss of the FRM.

Figure 6:
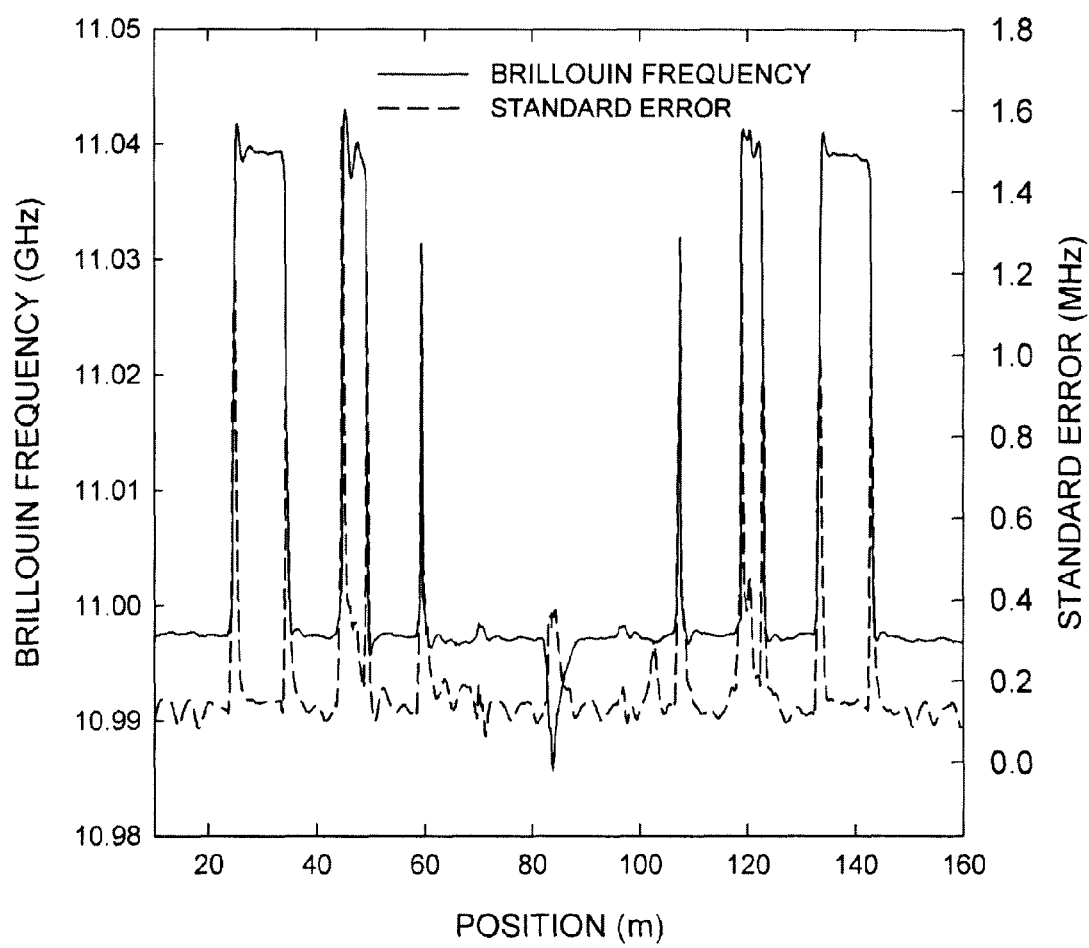
FIG. 6 depicts a Brillouin frequency distribution for a Brillouin system embodying principles of the invention.

Data was collected, as in a standard BOTDA system, by sweeping through a range of Brillouin frequencies from 10.9 GHz to 11.1 GHz in steps of 2 MHz. The system used the dark pulse technique in a Brillouin loss configuration and had a spatial resolution of about 800 mm. At each point in the time domain, the spectral data was fit to a Lorentzian function and the centre frequency of the fit was taken to be the local Brillouin frequency. The Brillouin frequency distribution is shown in FIG. 6. Although the fit frequency is expected to alternate only between the two values corresponding to the two types of fibre, an overshoot or undershoot is observed downstream of each transition. The standard error of each centre frequency is also shown in FIG. 6. It is apparent from the standard errors that the curve fit is poorer on the downstream side of the discontinuities.

Figure 7:
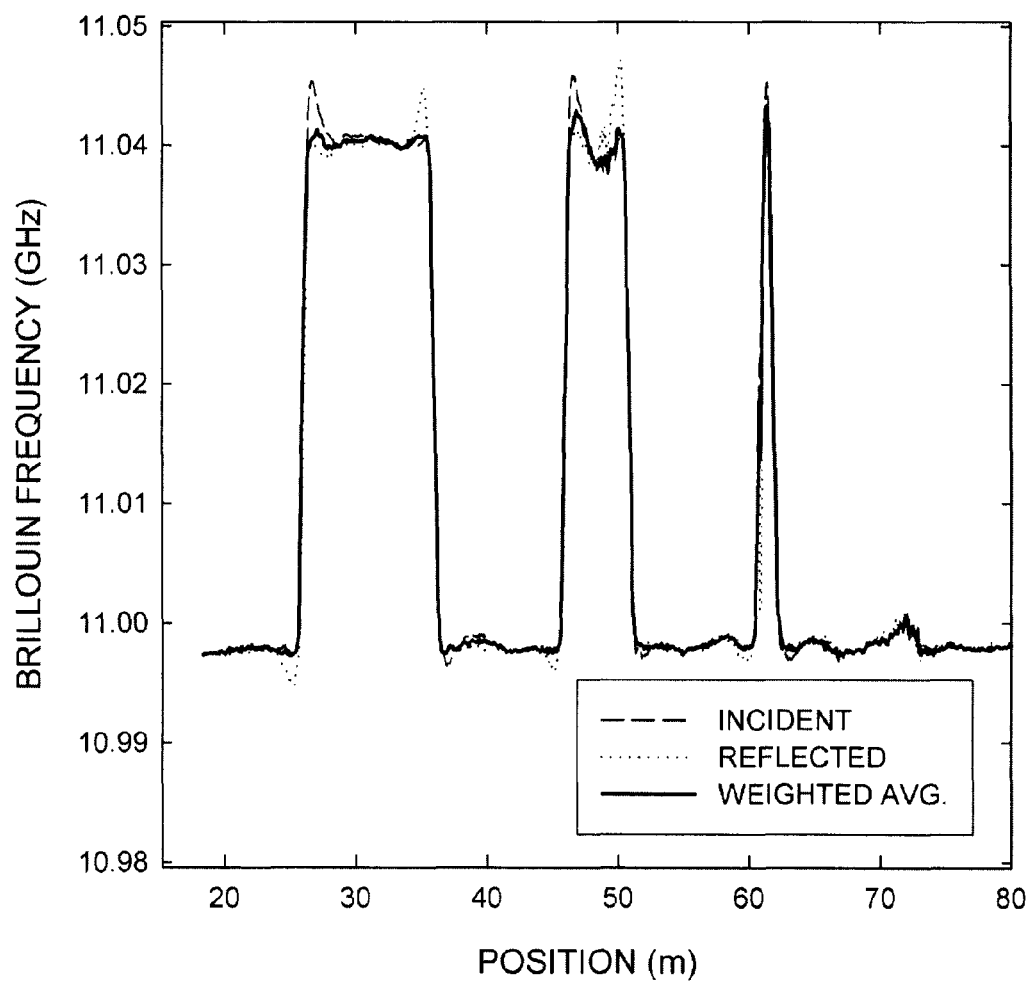
FIG. 7 depicts a frequency distribution as measured with incident and reflected signals and a weighted average of the two measurements for a Brillouin system embodying principles of the invention.

To reduce this error, Brillouin analysis sensor systems embodying the principles of the invention make use of the mirror image measurement available with such systems. Each physical location in the fibre has been measured and fit twice, once from the forward trip of the pulse and once from the reverse trip. Each of the curve fit results has associated with it not only the centre frequency, but also a goodness of fit parameter. One can use this parameter to help determine the true centre frequency. A simple method to do this would be to compare the standard error values from the two curve fits and choose the one that had a better fit (i.e. lower standard error or higher r-squared). This is based on the premise that a spectrum containing a substantial residual peak will have a poorer fit to an ideal Lorentzian function. A more sophisticated approach (demonstrated here) is to take a weighted average of the two measurements, using the standard error of the curve fit to assign a weight. This has the advantage of making full use of both data points in regions where the fit results are comparable in accuracy. Other methods of using the extra data are certainly possible. Since the downstream and upstream directions have been reversed, the distorted downstream spectra in one trace are at least partially correctable from their undistorted upstream counterparts in the mirror image. FIG. 7 shows this to be the case.

Figure 8:
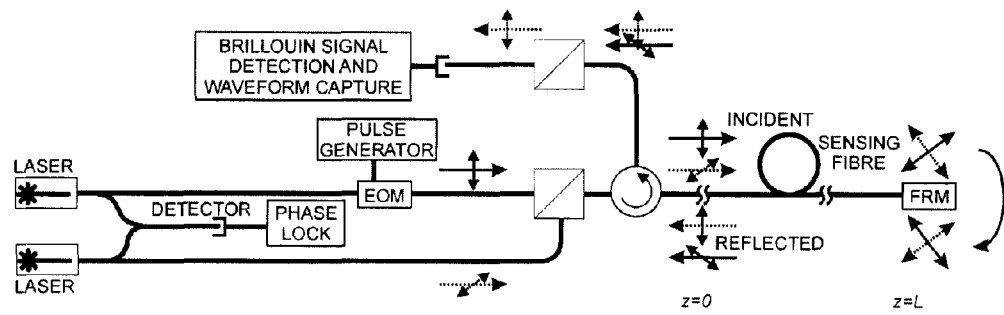
FIG. 8 depicts another Brillouin system embodying principles of the invention.

Other configurations for Brillouin Analysis sensor systems embodying the principles of the invention are possible, and two are shown below. In FIG. 8, the location of the circulator and PBS have been interchanged. In this situation, both the Faraday reflected cw (which is the Brillouin signal) and the orthogonal reflected pulse are routed to the detector by the beamsplitter. The reflected pulse signal must be removed from the Brillouin signal and this can be done with a polarizer or second PBS. This configuration otherwise operates in identical fashion to that of FIG. 2.

Figure 9:
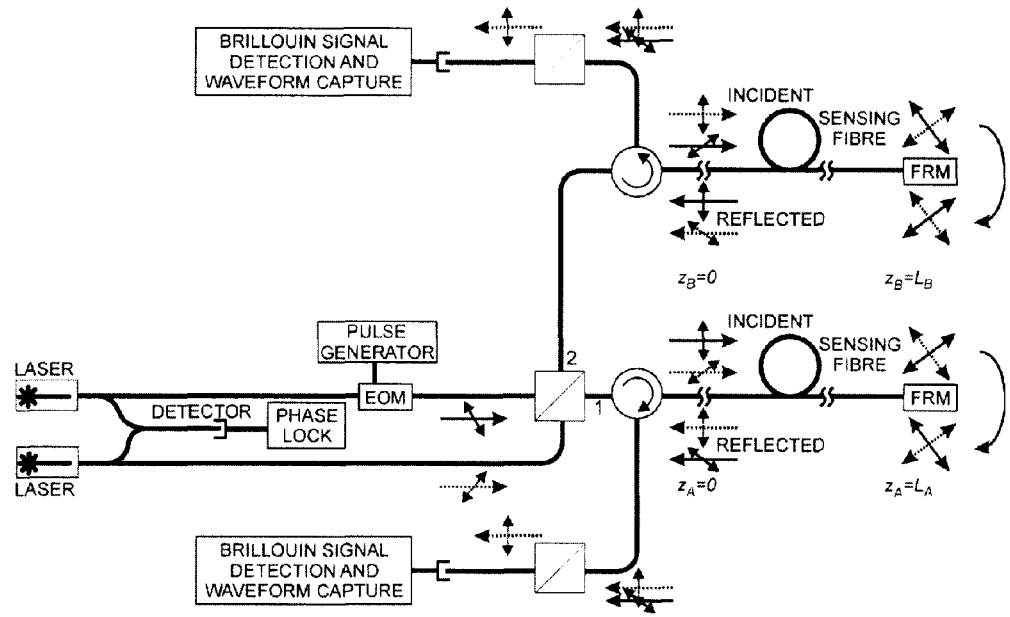
FIG. 9 depicts a Brillouin system embodying principles of the invention comprising dual fibres.

The configuration in FIG. 9 is similar to that in FIG. 8, however both lasers are launched into the beamsplitter with linear polarization inclined at 45° to the beamsplitter axis. Because of this, the power from each laser is divided between the ports 1 and 2 (instead of all going to port 1) while maintaining relatively orthogonal SOPs. With the addition of a second PM circulator, sensing fibre, FRM, and detector this produces two independent Brillouin Analysis sensor subsystems embodying the principles of the invention with one pair of lasers. Each of the subsystems is connected to a different sensing fibre which could be, for example, used to monitor different parts of a structure. Alternatively, the second sensing fibre could be used in a temperature only configuration to compensate for temperature effects on strain measurements made with the first fibre. Again, it should be noted that the principles of the invention are appropriate for use with BOTDA, BOFDA or BOCDA sensing systems.

I claim:

1. A Brillouin analysis sensor system comprising:
a Brillouin analysis sensor;
a polarization beam splitter/combiner, operably connected to the Brillouin analysis sensor between the sensor and the sensing fibre, for receiving polarized lightwaves from the sensor, combining the lightwaves and launching combined lightwaves waves in the sensing fibre a first direction, and
a phase conjugate mirror at a free end of the sensing fibre for receiving combined lightwaves from the polarization beam splitter/combiner, rotating the polarization of the combined lightwaves and launching the rotated combined lightwaves in the sensing fibre in an opposing direction to the first direction.

2. The system of claim 1, wherein the Brillouin analysis sensor is selected from the group consisting of a Brillouin Optical Time-Domain Analysis sensor, a Brillouin Optical Frequency Domain Analysis sensor and a Brillouin Optical Correlation Domain Analysis sensor.

3. The system of claim 1 wherein the sensing fibre is a single mode fibre.

4. The system of claim 1 wherein the phase conjugate mirror is a Faraday Rotator Mirror.

5. The system of claim 1 wherein the lightwaves are pulsed and Stokes lightwaves.

6. The system of claim 4 wherein the combined lightwaves comprise lightwaves with states of polarization orthogonal to one another.

7. The system of claim 1 further comprising a polarization controller in the path between the polarization beam splitter/combiner and the phase conjugate mirror.

8. The system of claim 7 further comprising a controller for adjusting the polarization beam splitter/combiner to track changes in the principal axes of the sensing fibre.

9. The system of claim 1 wherein a circulator is located between the polarization beam splitter/combiner and the phase conjugate mirror.

10. The system of claim 1 further comprising a second polarization beam splitter/combiner, operably connected to the Brillouin analysis sensor between lasers of the sensor and a second sensing fibre, for receiving polarized lightwaves from the sensor, combining the lightwaves and launching combined lightwaves waves in the second sensing fibre a first direction, and
a phase conjugate mirror at a free end of the second sensing fibre for receiving combined lightwaves from the second polarization beam splitter/combiner, rotating the polarization of the combined lightwaves and launching the rotated combined lightwaves in the sensing fibre in an opposing direction to the first direction.

11. A Brillouin analysis sensor system comprising:
a Brillouin analysis sensor comprising a single laser;
a polarization modulator, operably connected to the Brillouin analysis sensor between the laser of the sensor and the sensing fibre, for receiving polarized lightwaves from the sensor, and rotating lightwaves and launching lightwaves in the sensing fibre a first direction, and
a phase conjugate mirror at a free end of the sensing fibre for receiving lightwaves from the polarization modulator, rotating the polarization of the combined lightwaves and launching the rotated combined lightwaves in the sensing fibre in an opposing direction to the first direction.

12. The system of claim 11 wherein the sensing fibre is a single mode fibre.

13. An intrusion detection system comprising the system of claim 2.

14. A method for measuring strain or temperature in an optical fibre distributed sensor using a Brillouin analysis sensor comprising:
launching in a first direction in a first optical fibre a first wave having a state of polarization;
launching in an opposing direction in the first optical fibre a second wave having a state of polarization orthogonal to that of the first signal;
combining the first and second waves and propagating the combined wave in a first direction in a second optical fibre;
rotating the state of polarization of the combined wave such the state of polarization of the rotated combined wave is orthogonal to that of the combined wave;
propagating the rotated combined wave in an opposing direction in the second optical fibre;
measuring the Brillouin interaction of the combined wave and the inverted combined wave; and
calculating a strain or temperature from the Brillouin interaction.

15. The method of claim 14, the step of measuring the Brillouin interaction comprising measuring the Brillouin interaction in opposite directions in the sensing fibre.

16. The method of claim 14 wherein the first wave is a pump wave and the second wave is a Stokes wave.

17. The method of claim 16 wherein the pump wave is vertically polarized and the Stokes wave is horizontally polarized.

18. The method of claim 16 wherein the first and second fibres are single mode fibres.

19. The method of claim 18 wherein the Brillouin analysis sensor is selected from the group consisting of a Brillouin Optical Time-Domain Analysis sensor, a Brillouin Optical Frequency Domain Analysis sensor and a Brillouin Optical Correlation Domain Analysis sensor.

20. The method of claim 18 wherein the combined wave is combined using a beam splitter/combiner and the combined signal is rotated using a phase conjugate mirror.

21. The method of claim 20 wherein the phase conjugate mirror is a Faraday Rotator Mirror.

* * * * *